(12) United States Patent
Benson

(10) Patent No.: US 7,184,896 B1
(45) Date of Patent: Feb. 27, 2007

(54) SYSTEM AND METHOD FOR TRACKING AND DISPLAYING HAZARDOUS MATERIAL CLOUDS

(75) Inventor: Tony Lockhart Benson, Huntsville, AL (US)

(73) Assignee: Baron Services, Inc., Huntsville, AL (US)

( * ) Notice: Subject to any disclaimer, the term of this patent is extended or adjusted under 35 U.S.C. 154(b) by 0 days.

(21) Appl. No.: 11/197,024

(22) Filed: Aug. 4, 2005

(51) Int. Cl.
G06F 19/00 (2006.01)
G06F 11/00 (2006.01)

(52) U.S. Cl. .................. 702/24; 702/187; 702/188; 342/27; 342/28

(58) Field of Classification Search ............... 702/24, 702/31–32, 187, 188; 706/10, 27, 60; 342/22, 342/27–28, 54; 340/968
See application file for complete search history.

(56) References Cited

U.S. PATENT DOCUMENTS

| 5,661,649 A * | 8/1997 | Carson et al. ............... 702/2 |
| 6,018,699 A | 1/2000 | Baron et al. |
| 6,275,774 B1 | 8/2001 | Baron et al. |
| 6,289,331 B1 * | 9/2001 | Pedersen et al. ............. 706/60 |
| 6,490,525 B2 | 12/2002 | Baron et al. |
| 6,493,633 B2 | 12/2002 | Baron et al. |
| 2003/0222795 A1 * | 12/2003 | Holforty et al. ............ 340/968 |

* cited by examiner

Primary Examiner—Bryan Bui
(74) Attorney, Agent, or Firm—Lanier Ford Shaver & Payne PC; George P. Kobler

(57) ABSTRACT

A system for real-time tracking and display of movement of an airborne hazardous agent includes one or more mobile units each having a wind parameter measuring apparatus that provides real-time wind direction and speed, a navigation system that provides a mobile unit heading and real-time position of the mobile unit, and a radio transmitter; a computer system having an input for receiving the wind parameters and the mobile unit heading and the mobile unit position, a processor and a memory and that is configured with control logic to enable the computer system to obtain the wind parameters, mobile unit heading, mobile unit position, determine a wind heading and generate an image having a geographic point corresponding to position where the hazardous agent was released, a graphical indication of possible movement over time, and a graphical indication of predicted movement over time based upon the wind parameters; and a display for displaying the image.

46 Claims, 3 Drawing Sheets

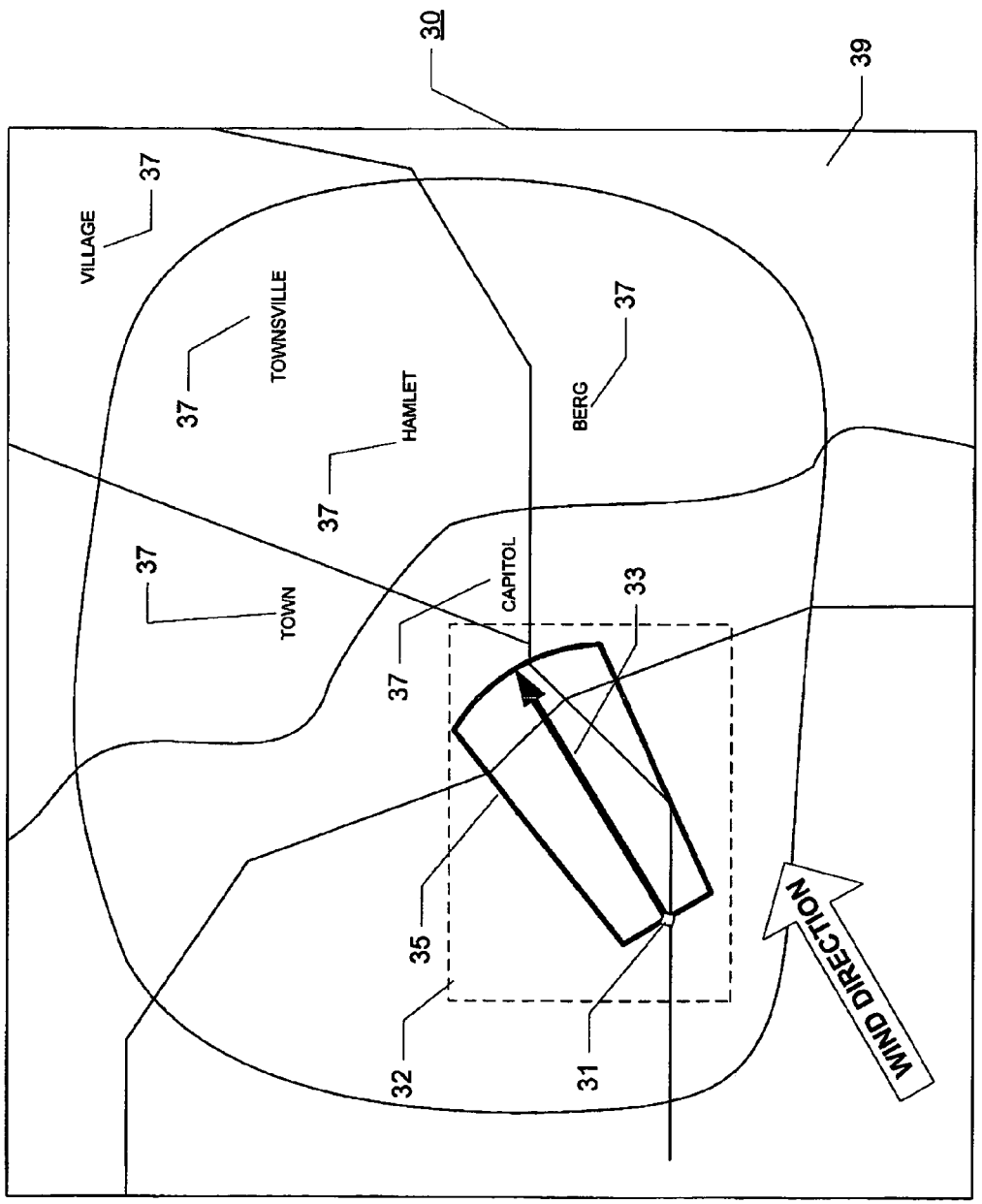

SYSTEM AND METHOD FOR TRACKING AND DISPLAYING HAZARDOUS MATERIAL CLOUDS

BACKGROUND

1. Field

Figure 1:
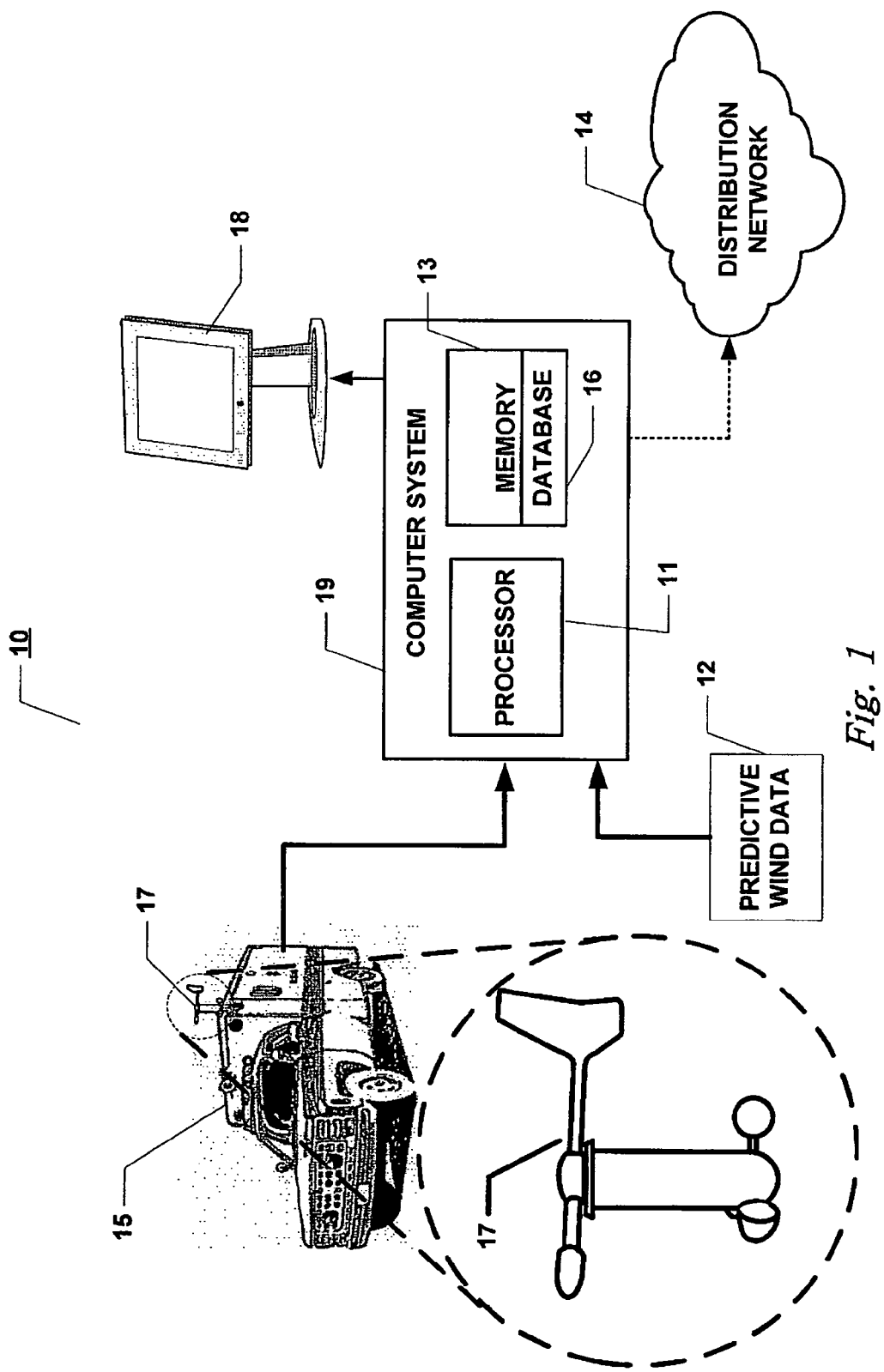
Figure 2:
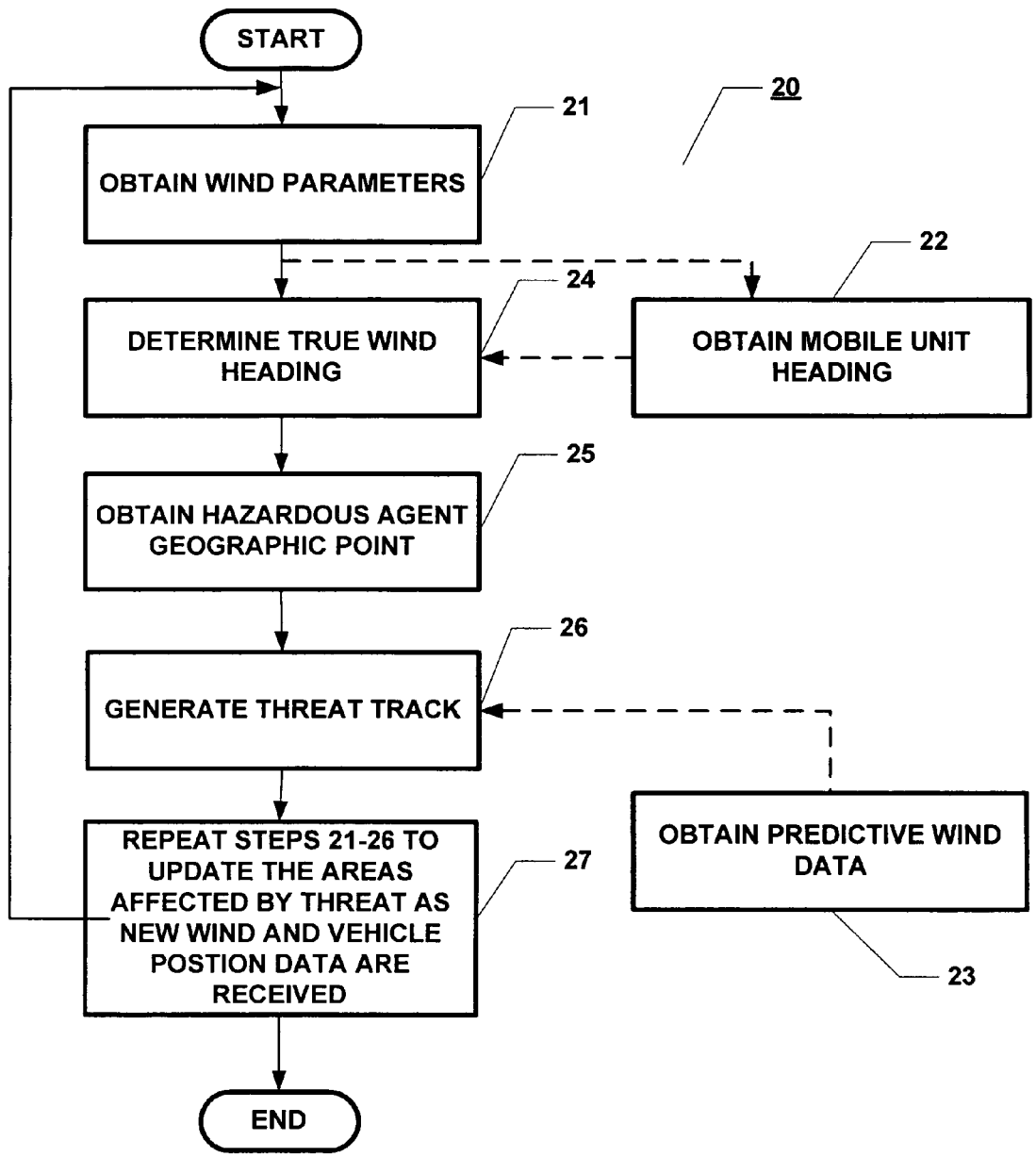

The present invention relates generally to airborne hazardous agents, and in particular to real-time tracking of airborne hazardous agents.

2. Description of the Problem and Related Art

In this age, there exists a persistent threat of intentional use of weapons of mass destruction including biological, radiological and chemical weapons. In addition, progress brings about an increase in the commerce of hazardous chemical agents using land-based transportation where such agents may be released into the air unintentionally as a result of an accident. Accidents at nuclear power facilities may result in release of radioactive particles becoming airborne.

At this time, warning the public and informing emergency response personnel, e.g., police, firefighters, emergency management authority, or the like, of the release of hazardous agents into the air consists of text information, aural information, and graphic information. However, the graphic information tends to be hampered in that it is merely predictive. In other words, the generation of the graphic information tends to use forecasted winds to show a prediction of the area that might be affected by the airborne hazardous agents. This information might be untimely if the winds change.

SUMMARY

The present disclosure is directed to a system and method for providing real-time tracking of airborne hazardous agents.

For purposes of summary the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A system for real-time tracking and display of movement of an airborne hazardous agent comprises one or more mobile units, where the mobile units includes a wind parameter measuring apparatus that provides real-time wind parameters, a navigation system that provides a real-time heading and position of said mobile unit, and radio transmitting means; a computer system that receives the real-time wind parameters and the mobile unit heading and position, and is configured with software to determine a real-time wind heading and generate an image indicating a geographic point corresponding to the position where said hazardous agent was released, and indicating predicted movement over time based upon said real-time wind parameters; and a display for displaying the image.

The method of real-time tracking of airborne hazardous agents comprises obtaining real-time wind parameters experienced proximate to the geographic location of release of hazardous agents, the geographic location, and the real-time mobile unit heading; determining the real-time true wind heading; and generating an image indicating said geographic location, and predicted movement of the hazardous agents over time based upon said real-time wind parameters.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1 is a functional diagram of the system according to an embodiment of the present invention;

FIG. 2 is a flowchart depicting the method according to an embodiment of the present invention; and FIG. 3 is an exemplary graphic illustrating the type of image that may be generated by the system according to an embodiment of the present invention.

DETAILED DESCRIPTION

The various embodiments of the present invention and their advantages are best understood by referring to FIGS. 1 through 3 of the drawings. The elements of the drawings are not necessarily to scale, emphasis instead being placed upon clearly illustrating the principles of the invention. Throughout the drawings, like numerals are used for like and corresponding parts of the various drawings.

Depicted in FIG. 1 is a representation of the system 10 according to one embodiment of the present invention. Mobile unit 15 comprises wind parameter measuring apparatus 17 that provides measurements of wind parameters, including, for example, wind direction and velocity about mobile unit 15. Mobile unit 15 also comprises a global position system (GPS) receiver apparatus (not depicted), or other suitable land navigation system, or a combination thereof, by which the heading of the mobile unit relative to North and the geo-position of the mobile unit may be determined. The wind parameters and mobile unit heading and position are provided to a computer system 19 that processes the data and displays the geographic position of the threat along with a graphical prediction of the direction the threat will move over time.

Computer system 19 comprises a processor 11 and a memory 13. Memory 13 may be configured with a database 16, and associated control logic which configures computer system 19 to perform the steps in the instant inventive process. The various image products generated by computer system 19 are output to display 18, which may be a computer monitor, a television screen, or the like, suitable for display of a digital image. Optionally, the image products may be output to a distribution system 14 for distributing the image products to remote displays (not shown) either wirelessly, over land lines, or both. Database 16 may store, among other things, place names associated with geographic references, road labels, political boundary position information, and data related to properties of hazardous materials likely to be distributed by wind, or the like.

Mobile unit 15 may be a response vehicle that is dispatched to a site at which release of hazardous agents has occurred. The hazardous agents contemplated herein include those which are likely to become airborne through evaporation or sublimation, or those that may be all or partially in a particulate form and capable of becoming airborne, or the like. Hazardous agents may be in any state of matter when exposed to the environment. Such agents also include chemical and biological agents that may be distributed by becoming airborne. In addition, hazardous agents may include radioactive material. The geographic location of the hazardous agent release site may be represented in any suitable geo-referencing system, for example, latitude and longitude, or the like. The position may be derived from the position of mobile unit in relation to the release site, or from other sources, including news reports, witnesses, emergency or military personnel.

Wind parameter data measured at the site by wind parameter measuring apparatus 17 and mobile unit heading from GPS receiver apparatus 12 are provided to computer system 19 along with the geographic location of the hazardous agent release site. In lieu of using such apparatus on a mobile unit, local wind parameters may be obtained from nearby weather observation stations. Another input received by computer system 19 is predictive wind data 12. Predictive wind data is available from a variety of weather information sources, and is typically derived from wind forecast models.

Computer system 19 executes control logic to process the provided data to calculate the predicted movement of airborne hazardous agents over time. This prediction is used by computer system 19 to generate a graphic representation of the predicted threat movement over time known as a "threat track" Computer system 19 achieves generation of display graphic by overlaying the threat track on an image representing the geographic area. The composite image is then displayed upon display 18. Alternatively, the composite image may be provided to other displays remote from computer system, via distribution network 14. The composite image may be transmitted to the distribution network using a wireless transmitter or a land line, or any combination thereof.

Computer system 19 may be located on board mobile unit 15, or may be located at a stationary facility, a non-limiting example of which is a local emergency management agency. In the latter case, mobile unit 15 is equipped with a radio transmitter (not shown) suitable for transmitting wind parameters and mobile unit position and heading information to such a centralized processing facility. Further, computer system is configured to receive wind parameters and mobile unit heading and position information according to the medium and method used to transmit the information. Although not preferred, in circumstances requiring degraded operation, wind parameters and mobile unit heading and position information may be transmitted by voice over radio, received by a human computer operator who inputs the information in to computer system 19 manually through a standard input means, such as mouse, keyboard, or other suitable means for inputting data into a computer system. It should be noted that in some circumstances mobile unit may only be equipped with a compass, a speedometer, and a positioning device. In such situations, the mobile unit information is relayed by voice to the computer operator who then manually inputs such information. Alternatively, in the case where computer system is installed on the mobile unit, the onboard computer/mobile unit operator may input the information.

Although depicted as a vehicle, which may not only be a truck, but also may be a car, motorcycle, all-terrain vehicle, personnel transport, etc., those skilled in the relevant arts will appreciate that mobile unit 15 may be anything that is mobile and suitable for obtaining wind parameters and equipped with a positioning system and radio transmitting means for relaying wind parameters to the computer system. A non-limiting example is an individual on the scene of the release and a hand-held GPS, a portable wind measuring apparatus and a two-way radio that is in communication with a computer system operator. The individual conveys the data via the two-way radio, it is received by the computer system operator who then inputs the data into the computer system. Also, the individual could be equipped with a portable computer system, configured as described above.

Distribution network 14 may be any system suitable for distributing real-time threat information. This may be achieved by using one or more web sites via a global computer network such as the World Wide Web, by radio, by facsimile, and/or by e-mail messages, to name a few. In addition, the processed results may be distributed to television sets via a television broadcast. Moreover, the results may be distributed by any number of communication mediums, non-limiting examples of which are land line telephone networks, wireless telephone networks, television cable networks, television broadcast networks, via radio broadcasts, or via satellite distribution networks as would be appreciated by those skilled in the arts with the benefit of reading this disclosure. Thus, the results may be disseminated to the public, the business community, military or emergency response personnel. Distribution network 14 may also be a network for distributing real-time site specific emergency or threat information such as, but not limited to, the Saf-T-Net™ system manufactured by Baron Services, Inc., Huntsville, Ala.

In determining wind direction, heading of the mobile unit must sometimes be accounted for in the cases where wind measuring apparatus only provides wind direction relative to the platform on which they are mounted. In this case True Wind Direction, TW, may be determined by $$TW=(W+H)\%\ 360$$

where W is wind direction relative to mobile unit,

H is mobile unit heading, and

% is the modulus operator which returns the remainder of (W+H) divided by 360.

FIG. 2 is a flowchart of a method 20 used according to an embodiment of the present invention. Referring to FIG. 2, wind parameters 21 are obtained. It should be noted that wind speed and direction are available from a variety of sources as would be appreciated by those skilled in the relevant arts. These data are used to determine true wind heading 24. Hazardous agent release site geo-reference point is obtained 25 and the true wind heading and geo-reference point are used to generate a threat track 26. In the case wind measuring apparatus provides relative wind direction, there will be a further step of obtaining mobile unit heading 22, as described above. Additionally, when it is desired to provide an indication of possible affected areas as a result of changing winds, a step of obtaining predictive wind data 23 is included. It will be appreciated by those skilled in the relevant arts that steps 21–25 are in no particular order and may be performed concurrently. The flowchart depicted in FIG. 2 merely serves as a reference to fully describe the inventive method.

FIG. 3 illustrates an exemplary image 30 that may be generated by computer system 19 and displayed according to an embodiment of the present invention including threat track 32 overlaid upon an representing a geographic area 39 generated according to an embodiment of the present invention. It should be noted that elements of the drawing are not to scale and serve merely to illustrate the elements of a display according to the present invention. Threat track 32 comprises a geo-reference point 31 and a graphic display of the predicted movement of the airborne agent which may be a "fan-shaped" display or a "plume-shaped" display or the like. Threat track 32 may include a vector arrow 33 to show the direction and magnitude of threat movement. Fan 35 is a representation of where the threat may disperse based upon changes in wind parameters that may result. Changes in wind parameters are derived from the predictive wind data. The points constituting fan 35 and the vector arrow 33 correspond to geographic coordinate points, and may be in latitude/longitude, or other geo-locating system. Display 30 may include labels 37 of significant landmarks including communities, roads, waterways, and buildings that may be affected by the threat. Although not shown in the Figure, predicted times at which communities may become exposed to the threat calculated by the system, based upon directed and magnitude of threat movement, and possible threat movement, may also be displayed.

It should be noted that predictive wind data are obtained in order to generate an image representing possible geographic scope of the effect of airborne hazards. However, an image may include only the geographic release point of the hazardous agent and a vector indicating current wind speed and direction. Therefore, predictive wind data are unnecessary, and the inventive method may be performed without that step.

The detailed description that follows is presented largely in terms of processes and symbolic representations of operations performed by conventional computers, including computer components. A computer may be any microprocessor or processor (hereinafter referred to as processor) controlled device, such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker.

The computer may be a uniprocessor or multiprocessor machine. Additionally, the computer includes memory such as a memory storage device or an addressable storage medium. The memory storage device and addressable storage medium may be in forms such as, by way of example, a random access memory (RAM), a static random access memory (SRAM), a dynamic random access memory (RAM), an electronically erasable programmable read-only memory (EEPROM), a programmable read-only memory (PROM), an erasable programmable read-only memory (EPROM), hard disks, floppy disks, laser disk players, digital video disks, compact disks, video tapes, audio tapes, magnetic recording tracks, electronic networks, and other devices or technologies to transmit or store electronic content such as programs and data.

The computer executes an appropriate operating system such as Linux, Unix, Microsoft® Windows® 95, Microsoft® Windows® 98, Microsoft® Windows® NT, Apple® MacOS®, IBM® OS/2®, and the like. The computer may advantageously be equipped with a network communication device such as a network interface card, a modem, or other network connection device suitable for connecting to one or more networks.

The computer, and the computer memory, may advantageously contain control logic, also referred to as computer programs, or computer software, or other substrate configuration representing data and instructions, which cause the computer to operate in a specific and predefined manner as, described herein. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The control logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The control logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in nonvolatile memory, such as, by way of example, read-only memory (ROM).

As described above and shown in the associated drawings, the present invention comprises an apparatus for a system and method for tracking and displaying hazardous material clouds. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

I claim:

1. A system for real-time tracking and display of movement of an airborne hazardous agent comprising:
   a. one or more mobile units, each of said mobile units having a wind parameter measuring apparatus that provides real-time wind parameters, a navigation system that provides a real-time heading and position of said mobile unit, and radio transmitting means;
   b. a computer system having an input for receiving said real-time wind parameters and said real-time mobile unit heading and position, and configured with control logic to enable said computer system to obtain said wind parameters, mobile unit heading, mobile unit position, determine a real-time wind heading and generate an image indicating a geographic point corresponding to a position where said hazardous agent was released, and indicating predicted movement over time based upon said real-time wind parameters; and
   c. a display responsive to said computer system for displaying said image.

2. The system for real-time tracking and display of movement of airborne hazardous agents of claim 1, wherein said computer system is deployed with said mobile unit.

3. The system for real-time tracking and display of movement of airborne hazardous agents of claim 2, wherein said radio transmitting means is configured to transmit data, and said mobile unit transmits data representing said image to a distribution network.

4. The system for real-time tracking and display of movement of airborne hazardous agents of claim 3, wherein said distribution network is comprised of a plurality of mobile units.

5. The system for real-time tracking and display of movement of airborne hazardous agents of claim 3, wherein said distribution network comprises a global computer network.

6. The system for real-time tracking and display of movement of airborne hazardous agents of claim 3, wherein said distribution network includes an emergency management facility.

7. The system for real-time tracking and display of movement of airborne hazardous agents of claim 1, wherein said computer system has a second input comprising predictive wind data and said image includes an indication of possible geographic areas that might be affected by said airborne hazardous agent due to changing winds.

8. The system for real-time tracking and display of movement of airborne hazardous agents of claim 7, wherein said radio transmitting means is configured to transmit data, and said mobile unit transmits data representing said image to a distribution network.

9. The system for real-time tracking and display of movement of airborne hazardous agents of claim 8, wherein said distribution network is comprised of a plurality of mobile units.

10. The system for real-time tracking and display of movement of airborne hazardous agents of claim 8, wherein said distribution network comprises a global computer network.

11. The system for real-time tracking and display of movement of airborne hazardous agents of claim 8, wherein said distribution network includes an emergency management facility.

12. The system for real-time tracking and display of movement of airborne hazardous agents of claim 1, wherein said mobile unit is remote from said computer system and wherein mobile unit transmits said real-time wind direction and speed, and said real-time mobile unit heading and position.

13. The system for real-time tracking and display of movement of airborne hazardous agents of claim 12, wherein said computer system outputs said image to a distribution network.

14. The system for real-time tracking and display of movement of airborne hazardous agents of claim 13, wherein said distribution network comprises a plurality of mobile units.

15. The system for real-time tracking and display of movement of airborne hazardous agents of claim 13, wherein said distribution network is comprised of a global computer network.

16. The system for real-time tracking and display of movement of airborne hazardous agents of claim 13, wherein said distribution network includes an emergency management facility.

17. The system for real-time tracking and display of movement of airborne hazardous agents of claim 13, wherein said computer system has a second input comprising predictive wind data and said image includes an indication of possible geographic areas that might be affected by said airborne hazardous agent due to changing winds.

18. The system for real-time tracking and display of movement of airborne hazardous agents of claim 17, wherein said distribution network comprises a plurality of mobile units.

19. The system for real-time tracking and display of movement of airborne hazardous agents of claim 17, wherein said distribution network is comprised of a global computer network.

20. The system for real-time tracking and display of movement of airborne hazardous agents of claim 17, wherein said distribution network includes an emergency management facility.

21. A method of real-time tracking of airborne hazardous agents comprising the steps of:
   a. obtaining real-time wind parameters experienced proximate to a geographic location of release of hazardous agents, said real-time wind parameters including a wind direction and a wind velocity;
   b. obtaining said geographic location;
   c. obtaining a real-time heading of a mobile unit;
   d. determining real-time true wind direction heading; and
   e. generating an image indicating said geographic location, and indicating predicted movement of said hazardous agents over time based upon said real-time wind parameters.

22. The method of real-time tracking of airborne hazardous agents of claim 21, further comprising a step of displaying said image.

23. The method of real-time tracking of airborne hazardous agents of claim 22, further comprising a step of transmitting said image to a distribution network.

24. The method of real-time tracking of airborne hazardous agents of claim 23, wherein said distribution network comprises a plurality of mobile units.

25. The method of real-time tracking of airborne hazardous agents of claim 23, wherein said distribution network is comprised of a global computer network.

26. The method of real-time tracking of airborne hazardous agents of claim 23, wherein said distribution network includes an emergency management facility.

27. The method of real-time tracking of airborne hazardous agents of claim 21, further comprising a step of obtaining predictive wind data.

28. The method of real-time tracking of airborne hazardous agents of claim 27, wherein said image includes an indication of possible geographic areas that might be affected by said airborne hazardous agent due to changing winds.

29. The method of real-time tracking of airborne hazardous agents of claim 28, further comprising the step of displaying said image.

30. The method of real-time tracking of airborne hazardous agents of claim 28, further comprising a step of transmitting said image to a distribution network.

31. The method of real-time tracking of airborne hazardous agents of claim 30, wherein said distribution network comprises a plurality of mobile units.

32. The method of real-time tracking of airborne hazardous agents of claim 30, wherein said distribution network is comprised of a global computer network.

33. The method of real-time tracking of airborne hazardous agents of claim 30, wherein said distribution network includes an emergency management facility.

34. A computer-readable storage device having computer-readable control logic embodied thereon, said control logic configured to, when executed by a computer, instruct the computer to perform a method for real-time tracking of airborne hazardous agents, said method comprising the steps of:
  a. obtaining current local wind parameters, said wind parameters including a wind direction and a wind velocity;
  b. obtaining geographic position of the release of hazardous agents;
  c. obtaining a heading of a mobile unit;
  d. determining true wind heading; and
  e. generating an image representing a geographic location of the release of hazardous agents, the possible movement of said hazardous agents, and the predicted movement of said hazardous agents in relation to a geographic area.

35. The computer readable storage device of claim 34, wherein said method further comprises a step of displaying said image.

36. The computer readable storage device of claim 34, wherein said method further comprises a step of transmitting said image to a distribution network.

37. The computer readable storage device of claim 36, wherein said distribution network comprises a plurality of mobile units.

38. The computer readable storage device of claim 36, wherein said distribution network is comprised of a global computer network.

39. The computer readable storage device of claim 36, wherein said distribution network includes an emergency management facility.

40. The computer readable storage device of claim 34, wherein said method further comprises a step of obtaining predictive wind data.

41. The computer readable storage device of claim 40, wherein said image includes an indication of possible geographic areas that might be affected by said airborne hazardous agent due to changing winds.

42. The computer readable storage device of claim 41, wherein said method further comprises the step of displaying said image.

43. The computer readable storage device of claim 41, wherein said method further comprises a step of transmitting said image to a distribution network.

44. The computer readable storage device of claim 43, wherein said distribution network comprises a plurality of mobile units.

45. The computer readable storage device of claim 43, wherein said distribution network is comprised of a global computer network.

46. The computer readable storage device of claim 43, wherein said distribution network includes an emergency management facility.

* * * * *